United States Patent
Liu et al.

(10) Patent No.: US 12,511,997 B2
(45) Date of Patent: *Dec. 30, 2025

(54) TECHNIQUES FOR AUTONOMOUS VEHICLE ACCIDENT MITIGATION

(71) Applicant: PlusAI, Inc., Santa Clara, CA (US)

(72) Inventors: Liu Liu, San Jose, CA (US); Yefei Peng, Palo Alto, CA (US); Hao Zheng, Saratoga, CA (US); Yu Sun, Santa Clara, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/912,014

(22) Filed: Oct. 10, 2024

(65) Prior Publication Data

US 2025/0124787 A1    Apr. 17, 2025

Related U.S. Application Data

(60) Provisional application No. 63/590,335, filed on Oct. 13, 2023.

(51) Int. Cl.
*G08G 1/0967* (2006.01)
*B60W 60/00* (2020.01)
(Continued)

(52) U.S. Cl.
CPC ..... *G08G 1/096725* (2013.01); *B60W 60/001* (2020.02); *G08G 1/0116* (2013.01);
(Continued)

(58) Field of Classification Search
CPC .......... G08G 1/096725; G08G 1/0116; G08G 1/0133; G08G 1/166; G08G 1/096783;
(Continued)

(56) References Cited

U.S. PATENT DOCUMENTS

| | | | |
|---|---|---|---|
| 8,760,314 B2 * | 6/2014 | Ramachandran .... | G08G 1/0141 340/995.13 |
| 9,646,428 B1 * | 5/2017 | Konrardy .......... | G06Q 10/0635 |

(Continued)

OTHER PUBLICATIONS

U.S. Appl. No. 18/912,274, Non-Final Office Action, Mailed on Jan. 17, 2025, 15 pages.

(Continued)

*Primary Examiner* — Luis A Martinez Borrero
(74) *Attorney, Agent, or Firm* — Kilpatrick Townsend & Stockton LLP

(57) ABSTRACT

Techniques are described for scenario data generation. An example method can include processing location-specific sensor information of a traffic accident at a location on a road network, the location-specific sensor information received from a sensor arranged on an infrastructure at the road network. The method can further include determining a location-specific element based on the location-specific sensor information. The method can further include determining a location-specific contributing factor of the traffic accident based on the location-specific element. The method can further include generating a location-specific model for simulating the traffic accident based on the location-specific contributing factor. The method can further include determining control instructions for a location-specific driving maneuver for an autonomous vehicle to mitigate a future traffic accident based on the location-specific model. The method can further include causing the control instructions to be transmitted to an actuator of the autonomous vehicle to perform the location-specific driving maneuver.

20 Claims, 15 Drawing Sheets

(51) Int. Cl.
*G08G 1/01* (2006.01)
*G08G 1/16* (2006.01)

(52) U.S. Cl.
CPC ..... *G08G 1/0133* (2013.01); *G08G 1/096783* (2013.01); *G08G 1/166* (2013.01); *B60W 2556/50* (2020.02); *B60W 2720/10* (2013.01)

(58) Field of Classification Search
CPC .......... B60W 60/001; B60W 2556/50; B60W 2720/10
USPC ....................................................... 701/117
See application file for complete search history.

(56) References Cited

U.S. PATENT DOCUMENTS

| | | | | |
|---|---|---|---|---|
| 9,805,601 | B1* | 10/2017 | Fields | G06F 18/214 |
| 10,782,693 | B2* | 9/2020 | Zhang | G08G 1/166 |
| 10,782,694 | B2* | 9/2020 | Zhang | G08G 1/167 |
| 11,714,971 | B2* | 8/2023 | Wray | G05D 1/0219 |
| | | | | 701/23 |
| 11,772,666 | B2* | 10/2023 | Zhu | B60W 30/165 |
| | | | | 701/25 |
| 12,174,027 | B2* | 12/2024 | Konrardy | G05D 1/0289 |
| 2014/0278034 | A1* | 9/2014 | Marko | G08G 1/0133 |
| | | | | 701/119 |
| 2015/0239413 | A1* | 8/2015 | Kozloski | B60R 21/0134 |
| | | | | 701/1 |
| 2015/0242552 | A1* | 8/2015 | Kozloski | B60R 21/0134 |
| | | | | 703/8 |
| 2016/0059855 | A1* | 3/2016 | Rebhan | B60W 30/095 |
| | | | | 701/41 |
| 2017/0256164 | A1* | 9/2017 | Haag | G06Q 50/26 |
| 2017/0341513 | A1* | 11/2017 | Wu | G06F 18/24 |
| 2018/0059669 | A1 | 3/2018 | Madigan et al. | |
| 2018/0299284 | A1* | 10/2018 | Wang | G08G 1/0112 |
| 2019/0012909 | A1 | 1/2019 | Mintz | |
| 2019/0384303 | A1* | 12/2019 | Muller | G06N 20/00 |
| 2020/0132497 | A1 | 4/2020 | Glebov et al. | |
| 2020/0326719 | A1* | 10/2020 | Tram | G06N 3/08 |
| 2021/0005085 | A1* | 1/2021 | Cheng | G08G 1/166 |
| 2021/0233396 | A1 | 7/2021 | Guo et al. | |
| 2021/0287536 | A1* | 9/2021 | Siltanen | B60W 60/001 |
| 2022/0048533 | A1 | 2/2022 | Ödblom | |
| 2022/0068123 | A1 | 3/2022 | Guo et al. | |
| 2022/0126864 | A1 | 4/2022 | Moustafa et al. | |
| 2022/0269279 | A1* | 8/2022 | Redford | G06N 3/045 |
| 2022/0309920 | A1* | 9/2022 | Yang | G08G 1/0141 |
| 2022/0351613 | A1 | 11/2022 | Hu et al. | |
| 2022/0375340 | A1* | 11/2022 | Pittman | G06N 20/00 |
| 2023/0004165 | A1* | 1/2023 | Sun | G06N 20/00 |
| 2023/0079196 | A1* | 3/2023 | Hari | B60W 30/09 |
| | | | | 701/26 |
| 2023/0139072 | A1 | 5/2023 | Haas et al. | |
| 2023/0256999 | A1* | 8/2023 | Donderici | B60W 50/0097 |
| | | | | 701/301 |
| 2023/0386325 | A1* | 11/2023 | Tseng | G08G 1/096844 |
| 2024/0092390 | A1* | 3/2024 | Philion | G06N 3/006 |
| 2024/0174242 | A1 | 5/2024 | Schaaf | |
| 2024/0233523 | A1 | 7/2024 | Vogel | |
| 2024/0326814 | A1 | 10/2024 | Al-Stouhi et al. | |
| 2024/0371264 | A1* | 11/2024 | Budan | G06N 3/04 |
| 2024/0416907 | A1* | 12/2024 | Barrera | B60W 30/18163 |
| 2025/0124788 | A1* | 4/2025 | Liu | G08G 1/096783 |

OTHER PUBLICATIONS

U.S. Appl. No. 18/912,274, Final Office Action, Mailed on May 27, 2025, 6 pages.

* cited by examiner

TECHNIQUES FOR AUTONOMOUS VEHICLE ACCIDENT MITIGATION

CROSS-REFERENCE TO RELATED APPLICATIONS

This application claims priority to and the benefit of U.S. Provisional Application No. 63/590,335, filed on Oct. 13, 2023; the contents of which are herein incorporated by reference in its entireties for all purposes.

BACKGROUND

Autonomous vehicles can employ computing systems to aid in the vehicle's operation. The automotive industry is focused on improving the safety aspects of a vehicle that operates in an autonomous mode. The automotive industry uses scenario-based testing methods for the testing and validation of an autonomous vehicle's safety features. Scenario-based testing can use various scenarios that test the safety features and functionality of an autonomous vehicle. One issue can be the generation of scenarios that can be used for testing and validation.

Embodiments are directed to address these and other problems, individually and collectively.

BRIEF SUMMARY

Various embodiments provide techniques for generating a simulation of a location-specific traffic event based on sensor data collected from a traffic sensor. A computing system can receive a recording of a traffic event from a traffic sensor arranged at a location on a road network. The traffic sensor can be affixed to a traffic infrastructure, such as a telephone pole or traffic controller box.

The computing system can use a machine learning model to identify an element of the road upon which the traffic event occurred. The machine learning model can further identify an element of a vehicle involved in the traffic event. Based on the identifications from the machine learning model, the computing system can generate a location-specific traffic simulation of the traffic event. The computing system can further model an autonomous vehicle at the traffic event as an additional vehicle that is present during the traffic event. The computing system can run the simulation to determine whether there are any location specific maneuvers that the autonomous vehicle can perform to mitigate the traffic event.

Other embodiments provide techniques for generating a simulation of a location-specific traffic accident based on sensor data collected from a traffic sensor. A computing system can receive a recording of a traffic accident from a traffic sensor arranged at location on a road network. The traffic sensor can also be affixed to a traffic infrastructure, such as a telephone pole or traffic controller box. The computing system can use a machine learning model to identify an element of the road upon which the traffic accident occurred. The machine learning model can further identify an element of a vehicle involved in the traffic event. Based on the identifications from the machine learning model, the computing system can determine a contributing factor for the accident. The computing system can then use the location-specific traffic accident model to generate a location-specific simulation of the traffic event. The computing system can further model an autonomous vehicle as an additional vehicle that is present during the traffic accident. The computing system can run the simulation to determine whether there are any maneuvers the autonomous vehicle can perform to mitigate the traffic accident.

DETAILED DESCRIPTION

Figure 1:
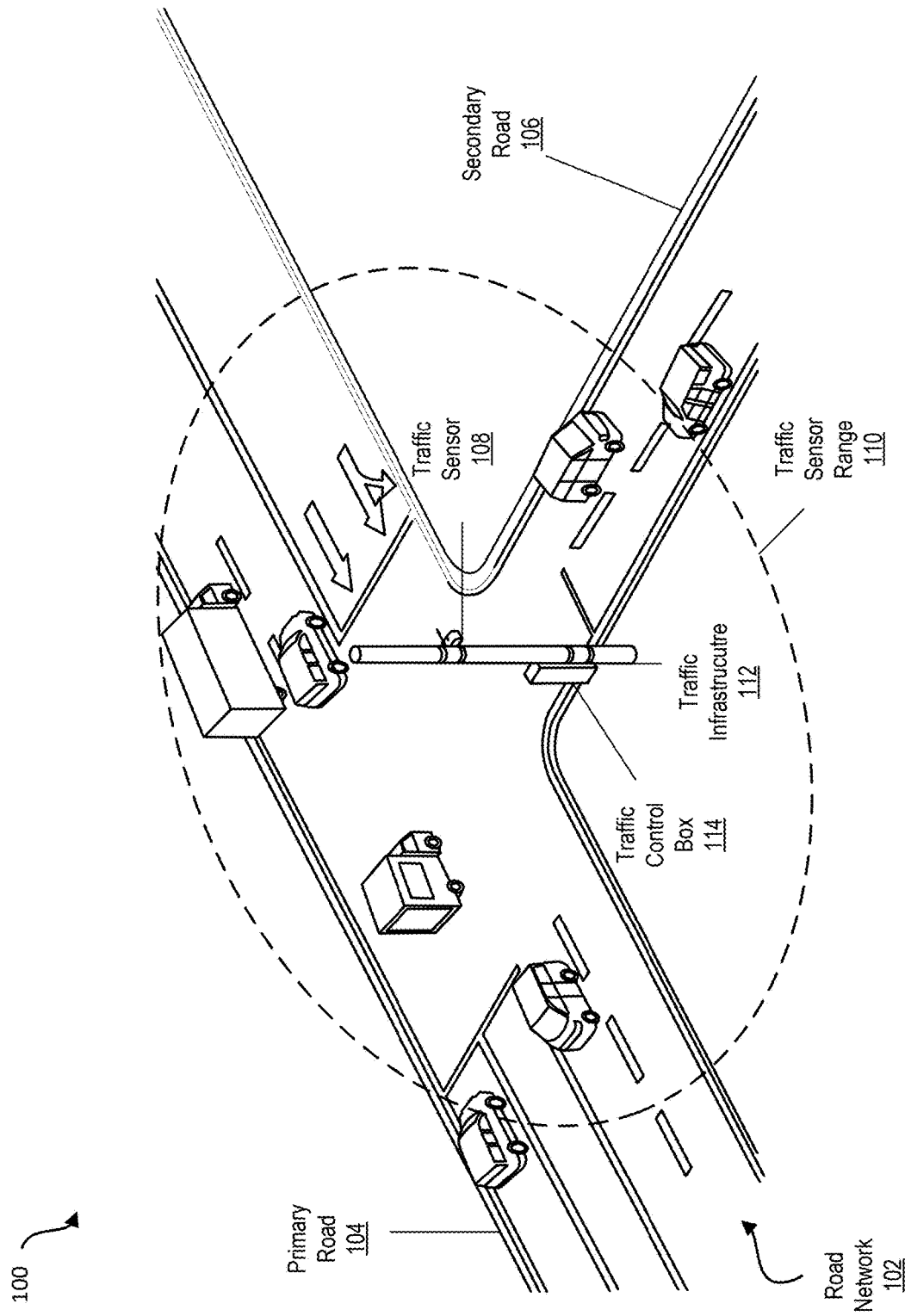
FIG. 1 is an illustration of an example traffic intersection, according to one or more embodiments.

In the following description, various embodiments will be described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing embodiments, some terms can be described in further detail.

As used herein, a "vehicle" may include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode.

As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

A "vehicle computer" may include one or more processors and a memory. A "processor" may include any suitable data computation device or devices. A processor may comprise one or more microprocessors working together to accomplish a desired function. A "memory" may be any suitable device or devices that can store electronic data. A suitable memory may comprise a non-transitory computer readable medium that stores instructions that can be executed by at least one processor to implement a desired method. Examples of memories may comprise one or more memory chips, disk drives, etc. Such memories may operate using any suitable electrical, optical, and/or magnetic mode of operation.

Details of some embodiments will now be described in greater detail.

A computing system can be used to generate a driving scenario that includes elements that affect controlling the operation of an autonomous vehicle (AV). Identifying various driving scenarios can assist the computing system to generate models that are representative of a traffic occurrence. The computing system can use the models to generate simulations of various driving scenarios. Driving scenarios can be defined by their elements. For example, the elements can include road elements (e.g., road width, road curvature, road signs, lane width, number of lanes). The elements can further include vehicle elements (e.g., vehicle year make and model, vehicle type, vehicle condition) for the automated vehicle to be tested and for the surrounding vehicles. The elements can also include situational elements of a particular traffic scenario, such as congestion, accident, mixed pedestrian and vehicle traffic, and other situational elements. It should be appreciated that one having ordinary skill in the art can contemplate additional elements for defining a driving scenario. The elements can be processed to generate a driving scenario model. The driving scenario model can be used to generate simulations to analyze for improving the driving patterns of an AV.

A conventional approach is to either use data from on-board vehicle sensors to generate the driving scenario information, or to use drones to collect data to be used as driving scenario information. In many instances, these sources of data can produce incomplete data or data that is collected from a poor vantage point. This can result in a poorly built model that does not assist in improving a driving pattern of an AV. Embodiments herein address the above referenced issues by providing techniques for using a location-specific traffic sensor to collect driving scenario information. The data can be used to generate location-specific models of traffic events and traffic accidents. The models can be used to generate simulations that can be used to improve the safety of an AV.

Figure 2:
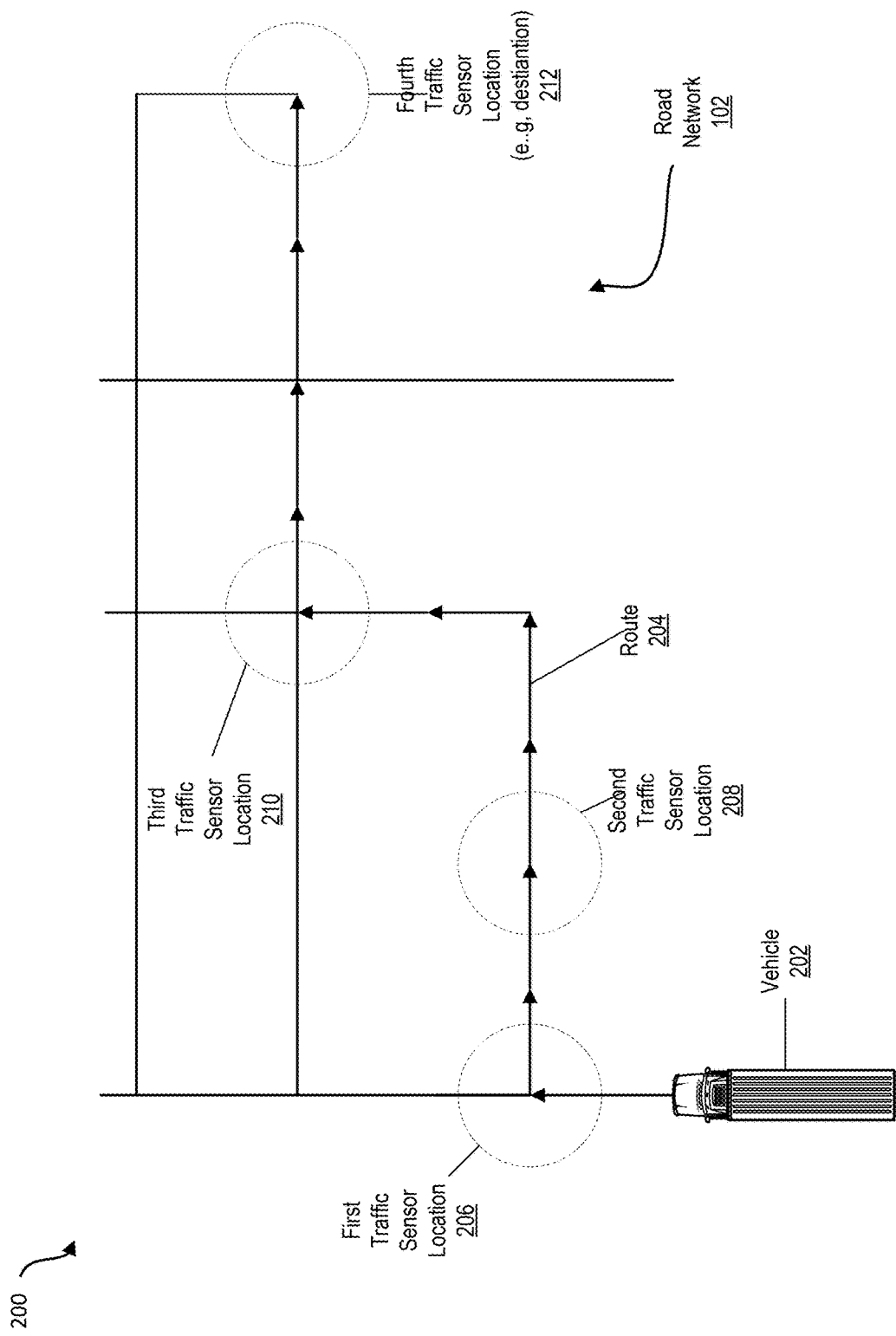
FIG. 2 is an illustration of a road network according to one or more embodiments.

FIGS. 1 and 2 are provided to describe road networks that can include traffic sensors positioned at specific locations to collect driving scenario information.

FIG. 1 is an illustration 100 of an example traffic intersection, according to one or more embodiments. An example road network 102 is illustrated to include a three-way intersection that includes a primary road 104 with four lanes and a secondary road 106 with two lanes. A traffic sensor 108 is arranged at the intersection and configured to collect driving scenario information. The traffic sensor 108 can have a traffic sensor range 110 indicated by the dashed line. The traffic sensor range 110 can include an area that the traffic sensor 108 can collect traffic information.

The traffic sensor 108 can have field of view bounded by the traffic sensor range 110. The field of view can determine the location-specific sensor information collected by the traffic sensor 108. For example, an on-board sensor of a vehicle can have different field of view than the traffic sensor based on being arranged on a vehicle rather than the traffic infrastructure 112. An on-board sensor may have a field of view that is configured for the immediate surroundings of a vehicle. In some instances, the vehicle may include a computer connected to the internet and receive information from other sensors outside of the vehicle. However, the vehicle's on-board sensor itself may be limited in its field of view. The traffic sensor 108 can be arranged to capture information at a much wider scale than the on board-sensor and provide more information than the on-board sensor. As the traffic sensor 108 is configured for a location rather an individual vehicle, the field of view can provide better representation of a location than an on-board sensor in a vehicle.

The traffic sensor 108 can be affixed to the traffic infrastructure 112 at the intersection. The traffic sensor range 110 can be based on the arrangement of the traffic sensor 108 on the traffic infrastructure 112. For example, the traffic sensor 108 can be affixed to a traffic light pole, a traffic light or an arm, a traffic control box 114, or other appropriate infrastructure. The traffic sensor 108 can include a single traffic sensor or a combination of traffic sensors. For example, the traffic sensor 108 can include an ultrasonic transceiver system, image-based system, a doppler system a controller-to-vehicle communication system or other sensor.

FIG. 2 is an illustration of a road network according to one or more embodiments. As illustrated, a road network 102 can include a set of interconnected streets that can be used by a vehicle 202 to travel along a route 204. For illustration purposes, the route 204 is illustrated as a set of vectors along a set of roads of the road network 102. There can be multiple traffic sensor locations along the route 204. For example, as illustrated, a vehicle 202 traveling along the route 204 can pass through a first traffic sensor location 206, a second traffic sensor location 208, a third traffic sensor location 210, and a fourth traffic sensor location 212. As illustrated, the fourth traffic sensor location 212 can be a destination. Each location can include one or more traffic sensors (e.g., traffic sensor 108) that are each configured to collect driving scenario information. Each traffic sensor's range (e.g., traffic sensor range 110) is illustrated using dashed lines. Each traffic sensor at each traffic sensor location can be configured to collect driving scenario information. The driving scenario information can be transmitted to a remote database for further processing.

As indicated above, a computing system can use driving scenario information to create models of driving scenarios. The following is a discussion of the first traffic sensor location 206. However, the discussion is applicable to each of the traffic sensor locations. The first traffic sensor location 206 can include a traffic sensor that collects driving scenario information and transmits the information a database. A computing system that includes one or more machine learning models that can access the driving scenario information from the database and use the driving scenario information to generate models of location-specific driving scenarios. This process is described with more detail below.

It is illustrated that the vehicle 202 can pass through three additional traffic sensor locations. Furthermore, not every traffic sensor location is necessarily an intersection. As illustrated, the second traffic sensor location 208 can be along a road of the road network 102. Each traffic sensor can independently collect driving scenario information that can be used generate location-specific driving scenario models. These location-specific driving scenario models can describe which elements (e.g., road elements, vehicle elements, environmental elements are other appropriate elements) that are included in a scenario, how the elements are related (e.g., how does the weather affect road conditions), and what is happening in the scenario (e.g., one vehicle rear ends another vehicle, vehicle cuts in front of another vehicle, or other traffic events). If more than one event occurs, the model can indicate a temporal ordering of the events that happen during a scenario. For example, a first vehicle pass through a red light at an intersection, and then a second vehicle at the intersection decelerates to avoid colliding with the first vehicle.

FIGS. 3-7 provide example illustrations of different embodiments that can utilize the driving scenario information collected at a traffic sensor location.

Figure 3:
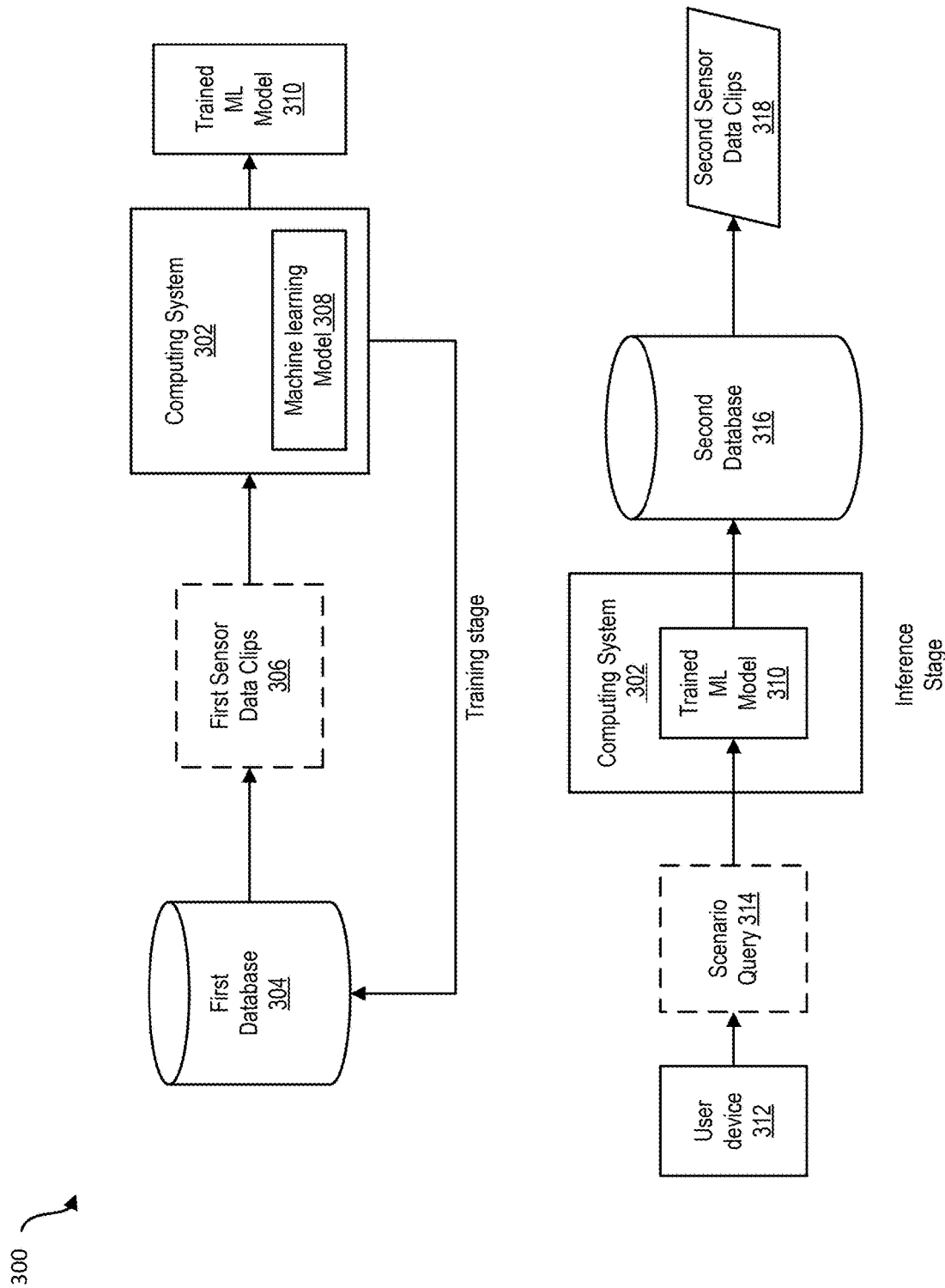
FIG. 3 is an illustration of an example system for sensor data clip identification, according to one or more embodiments.

FIG. 3 is an illustration 300 of an example system for sensor data clip identification, according to one or more embodiments. A computing system 302 can be configured to access a first database 304 for information (e.g., traffic sensor information) that includes first sensor data clips 306, where a sensor data clip can be a sequence of data of a traffic event (e.g., portions of information that include traffic events). The computing system 302 can further access a machine learning model (e.g., convolutional neural network (CNN) or other appropriate model) 308 to be trained to identify first sensor data clips 306 from the information. The training can be unsupervised training, such that the training information is not labeled to indicate the time stamps for the sensor data clips). In some instances, a sensor data clip can be a sequence of data that is approximately thirty seconds to a minute. For example, a sensor data clip can be a thirty second recording (e.g., a clip of the video corresponding to a traffic incident, LiDAR data collected at an intersection over a time interval) from a sensor (e.g., a traffic sensor 108).

The computing system 302 can use the first sensor data clips 306 to train the machine learning model 308 to identify sensor data clips from driving scenario information. The computing system 302 can train the machine learning model 308 to correctly characterize traffic events (e.g., a traffic accident, smooth traffic, congested traffic, or other traffic event). The computing system 302 can further validate the machine learning model 308 against the ground truth using a loss function. The computing system 302 can adjust the machine learning model's weights via backpropagation until the machine learning model 308 performs to a threshold accuracy. If the computing system 302 determines that the machine learning model 308 has an accuracy less than a threshold accuracy, the computing system 302 can continue training the machine learning model 308. If the computing system 302 determines that machine learning model 308 has an accuracy greater than the threshold, the computing system 302 can output a trained machine learning model 310.

During the inference stage, a user device 312 can be used to transmit a driving scenario query 314 to the computing system 302. The trained machine learning model 310 can be executable by the computing system 302. The driving scenario query 314 can be a request for a driving scenario and include a driving scenario element. For example, a user may want sensor data clips which have a desired element (e.g., "unprotected left turn,", "night,", "traffic jam,", "pedestrian," or other desired element). The trained machine learning model 310 can access a second database 316 that includes driving scenario information. The trained machine learning model 310 can analyze the driving scenario information and identify second sensor data clips 318 that have the desired element. The trained machine learning model 310 can further return the second sensor data clips 318 that have above elements. These second sensor data clips 318 can be used for generating traffic scenarios.

It should be appreciated that the trained machine learning model 310 can analyze the scenario query 314 and identify the clips with the assistance of embedding techniques or natural language techniques. In some embodiments, the computing system 302 can further use machine learning techniques to generate and include natural language descriptions of the second sensor data clips 318 as annotations. The natural language description can be used to identify a second sensor data clip 318 by other users. For example, a user can enter a keyword query or a natural language query into the user device 312 and the trained machine learning model 310 can use the natural language description to associate the query with a second sensor data clip 318.

It should be noted that a conventional "image" search tool that allows users to input any keyword, or a combination of keywords (e.g., "boat on truck" and "night"), to retrieve corresponding images from a database. While an image search may be useful for perception modules to collect training/testing data, modules such as prediction and planning usually require a sequence of data, which contains information regarding dynamic objects. In the herein-described embodiments, when a user inputs any keywords, the computing system can return consecutive frames of data which define a sensor data clip In other words, instead of returning images that match the input "object types," the herein-described computing system 302 can receive a natural language query and return clips matching the "scenario description" indicated in the natural language query. Furthermore, instead of directly using existing metadata or predefined event labels which require implementation of event mining software, the herein-described computing system can use a machine learning approach by building a neural network which can translate high-dimensional clips into scenario embeddings to be used to identity the clips without the use of event mining software.

Figure 4:
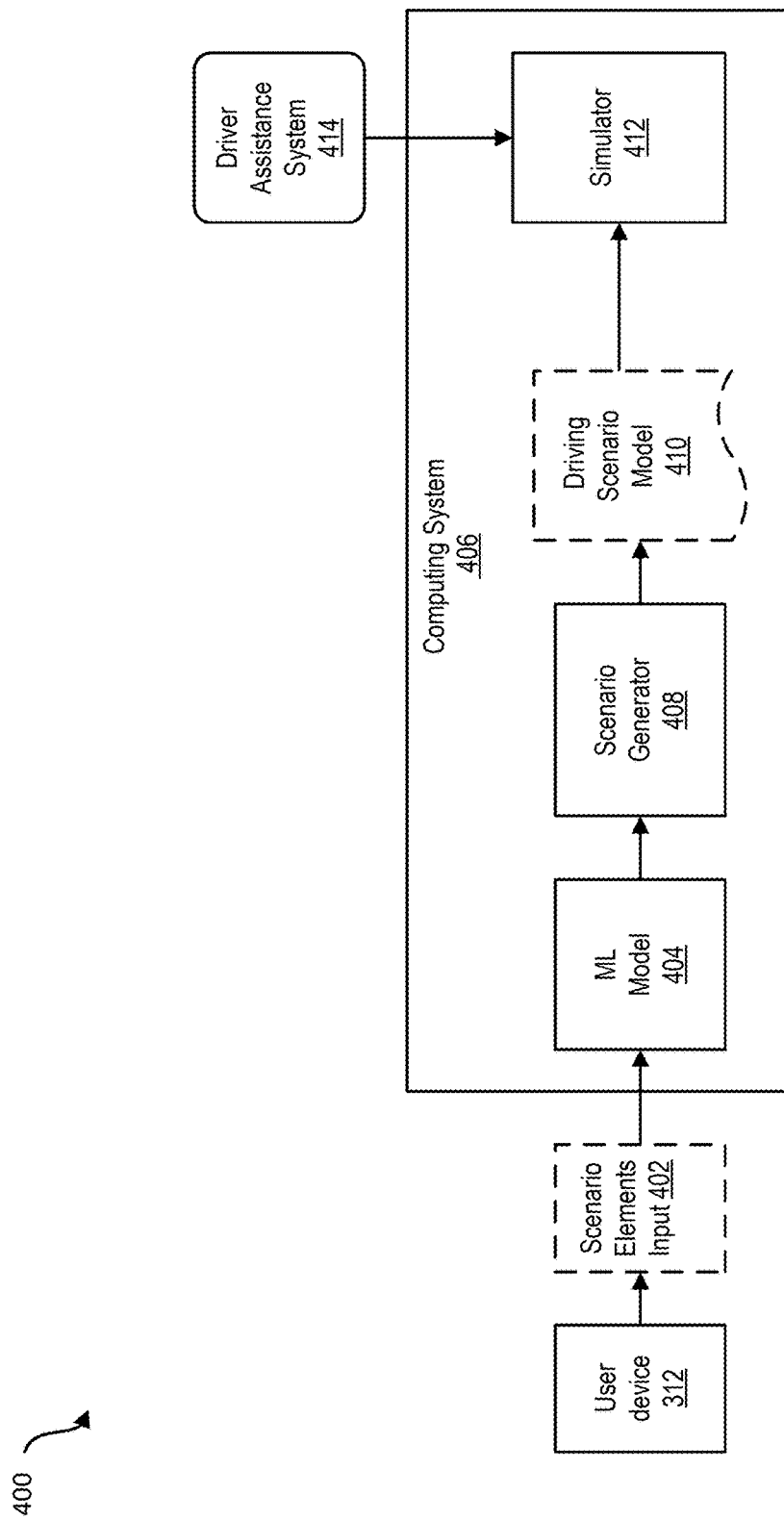
FIG. 4 is an illustration of an example system for scenario data generation, according to one or more embodiments.

FIG. 4 is an illustration 400 of an example system for scenario data generation, according to one or more embodiments. The user device 312 can transmit a driving scenario element input 402 to a machine learning model 404 executing on a computing system 406. The driving scenario element input 402 can include, for example, a request for a driving scenario model that can include desired elements, such as a curvature of the road, a multi-car incident, or slick road condition. A machine learning model 404 and a scenario generator 408 can further generate a driving scenario model 410.

The computing system 406 can transmit the driving scenario model 410 to a simulator 412. The simulator 412 can further receive information from a driver assistance system 414 (e.g., PlusDrive) to generate a simulation. In some instances, the simulations may not include desired elements for a particular location. For example, a location may generally include traffic accidents between 3:00 pm and 4:00 pm due to a nearby construction site. Therefore, the user device 312 can transmit instructions generate additional simulated scenarios to be used to generate a driving scenario model.

The instructions can include the elements to be included in the additional simulated scenarios. The computing system 406 can use, for example, a generative model to generate synthetic data representing the elements. The computing system 406 can further incorporate the synthetic data into the simulated scenarios. The simulated scenarios can be used for testing and validation of an autonomous vehicle's safety features and functionalities.

The computing system 406 can be trained to generate different scenarios 410 based on the same elements. These additional scenarios can be used to generate additional simulations. Conventional scenarios are directly transformed from recorded data, or by using variation (parameter sweep, fuzzing) technique. The herein-described embodiments do not rely on human tuning parameters to generate more scenarios. Rather, the herein-described techniques can use a generative model to generate the new scenarios and simulations.

Figure 5:
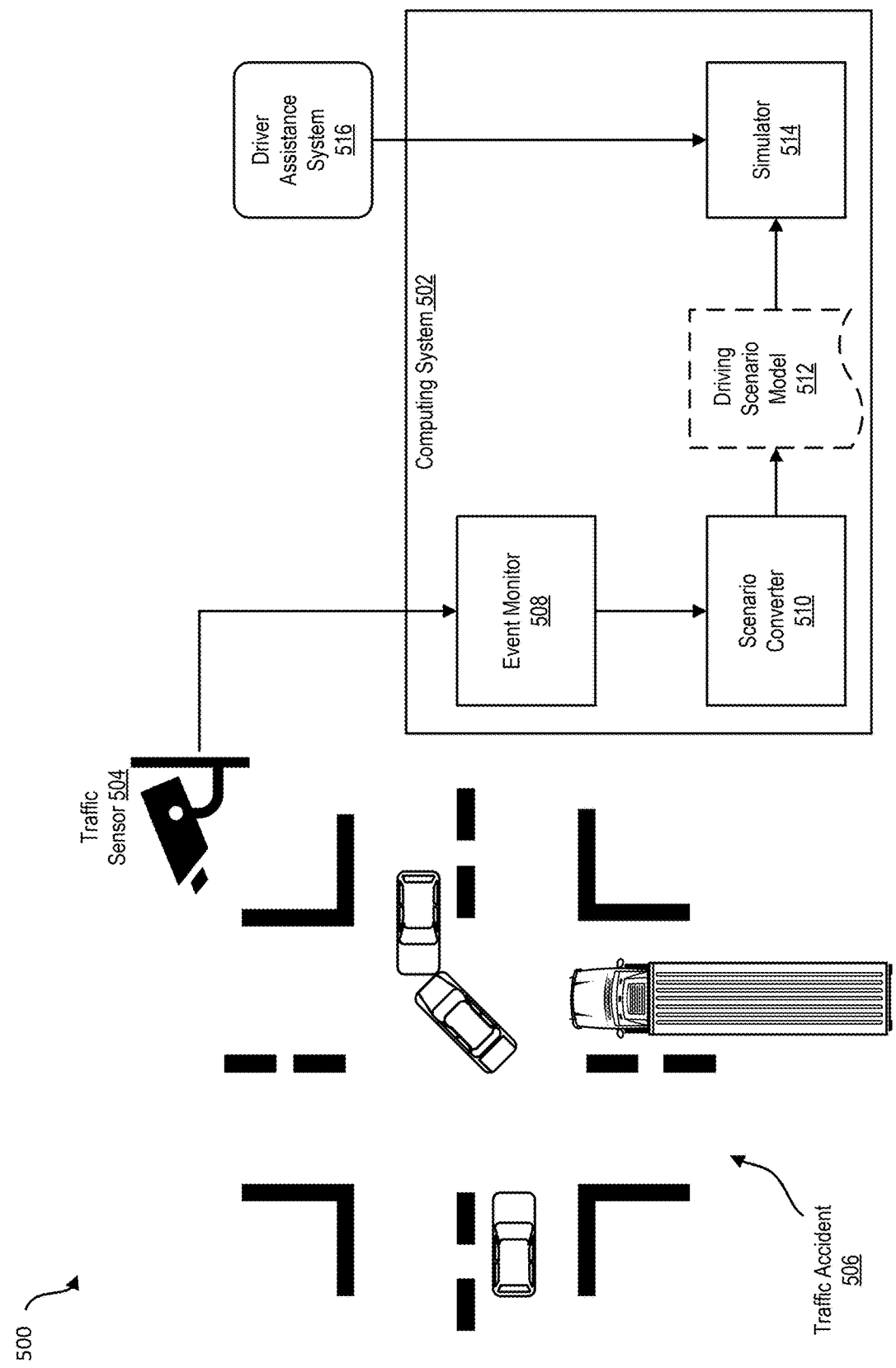
FIG. 5 is an illustration of an example system for accident scenario data generation, according to one or more embodiments.

FIG. 5 is an illustration 500 of an example system for accident scenario data generation, according to one or more embodiments. A computing system 502 can be configured to receive sensor information from a traffic sensor and evaluate a priority of traffic accidents. If the computing system 502 determines that the sensor information includes a priority traffic accident, the computing system 502 can determine to generate a simulation that includes a driving scenario model based on the sensor information. Whether a traffic accident is a priority traffic accident can be based on an input indicating elements (e.g., head on collision, fender bender, or other element) that define a priority traffic accident.

A traffic sensor 504 (e.g., traffic sensor 108) can be arranged at a road network (e.g., road network 102) and configured to record the traffic. For example, the traffic sensor 504 can be arranged at location (e.g., first traffic sensor location 206, second traffic sensor location 208, third traffic sensor location 210, and fourth traffic sensor location 210) along the road network. As illustrated, a traffic accident 506 can include a collision between two vehicles at an intersection. The recording (e.g., a sensor-based information) collected by the traffic sensor 504 can be transmitted to an event monitor 508. The event monitor 508 can include software and hardware for determining the priority of the traffic accident 506. For example, the event monitor 508 can include a machine learning model (e.g., a convolutional neural network (CNN) or other appropriate model) that is trained to identify elements. The event monitor 508 can further be trained to classify the traffic accident 506 as suitable for generating a driving scenario model. For example, in some instances, the traffic accidents with particular elements (e.g., head on collisions, fender benders, vehicle to bicycle collision, or other element) are prioritized. The machine learning model can be trained to extract features from the sensor information to identify one or more desired elements. The event monitor 508 can further annotate the sensor information to indicate an associated elements. For example, if the traffic accident 506 includes desired elements, such as property damage, the event monitor 508 can annotate the sensor information to indicate the property damage element.

If the event monitor 508 determines that the traffic accident 506 is suitable for a generating a driving scenario model, the event monitor 508 can transmit accident information (e.g., sensor information, annotation) to a scenario convertor 510. The scenario convertor 510 can be hardware and software that is configured to convert the sensor information collected by the traffic sensor 504 into a scenario 512. A scenario can be location-specific and include one or more elements that can be used to describe a traffic accident. The description of the traffic situation can include the environment (e.g., road type, weather, or other environmental description), traffic conditions (e.g., congestion, presence of pedestrians or bicyclists, or other traffic condition description), driver behavior (e.g., actions or reactions by a driver or autonomous vehicle), road features (e.g., roundabouts, number of lanes, road width or other road feature description), and occurrences (e.g., a traffic accident, emergency vehicles pass through, and other event descriptions). As indicated above, the elements can be road elements, vehicle, elements, situational elements, and other appropriate elements. Each of these elements can further be of a static, dynamic, and temporary nature that is represented in the driving scenario model 512. Static elements can include elements that remain constant throughout a traffic event (e.g., layout of road network), dynamic elements can include elements as to how one or more objects at the traffic event reacts (e.g., how does a vehicle move in reaction to oncoming traffic, how does a pedestrian react to a car travelling close by, or what is the reaction time to brake to avoid a collision, and so on), and the temporary elements can include elements that may change based on the time (e.g., weather, degree of traffic congestions, number of vehicles on the road, or number of pedestrians, and so on).

The scenario convertor 510 can include one or more machine learning models that is trained to process sensor information collected by the traffic sensor 504 and identify various elements. For example, the traffic sensor 504 can be an image capturing device that collects a sequences of images leading up to, during, and after the traffic accident 506. The one or more machine learning models can be trained to process image data from the traffic sensor 504 and identify various elements, including their nature. The scenario convertor 510 can further annotate the sensor information as metadata to indicate the elements. The scenario convertor 510 can then use the elements to generate a driving scenario model 512.

The driving scenario model 512 can be a representation of the elements that form the scenario. Consider the following example scenario, on a rainy day a first vehicle approaches an intersection with a second vehicle approaching from the opposite direction. The first vehicle runs a red light and makes left turn at the intersection. The second vehicle decelerates quickly, but ultimately collides with the first vehicle. The driving scenario model 512 can assist in defining the different elements of the scenario (e.g., first vehicle, second vehicle, intersection, deceleration, road condition, stop sign visibility, weather, or other element). The driving scenario model 512 can help define how the elements are related (e.g., the first vehicle and the second vehicle colliding). The driving scenario model 512 can also describe happened (e.g., the first vehicle ran a red light and collided with the second vehicle). This scenario can be captured by a traffic sensor 504 at a specific location.

The computing system can generate the driving scenario model 512 to capture spatial and topological relationships between the elements. The spatial relationships can include a positions of the vehicles at particular time points. These positions can sometimes be known as station (s)-coordinates. For example, at t0, the positions of the vehicles can be at opposite sides of the intersection. At t1, the position of the first vehicle can be in a lane of the second vehicle in the middle of the intersection, and a position of the second vehicle can be in the second vehicle's lane. At t3, the position of the first vehicle may be the same, and the position of the second vehicle may be in its lane in the middle of the intersection as illustrated in FIG. 5.

The computing system 502 can further encode this spatial information onto a topological information for the driving scenario model 512. For example, the computing system 502 may be able to determine the specific location of the traffic sensor 504 based on a traffic sensor identifier included in the sensor information. The computing system 502 can further access a road network (e.g., road network 102) based on the specific location of the traffic sensor 504. The road network can include topographical information, such as a directional graph of the interconnected roads surrounding the traffic sensor 504. For example, the computing system 502 can access a database (e.g., a map application database) and access a map tile that includes the location of the traffic sensor 504, where the map tile is a specific portion of a map. The computing system 502 can encode the topological information of the map tile with the spatial information. For example, the map tile can include a representation of the road network, including the lanes of each road. The computing system 502 can encode the topological information to indicate the position of each vehicle at each point in time. In some instances, there was no AV vehicle present during the real-life scenario captured by the traffic sensor 504. Therefore, the computing system 502 can further generate synthetic data (e.g., synthetic spatial information, synthetic topological information, and synthetic temporal information) for a hypothetical AV to be present at the scenario. The synthetic data can include one or more mathematical representations of the AV that can be incorporated into a driving scenario model. For example, the computing system 502 can generate synthetic information to introduce a semi-truck AV that is positioned at cross-street of the intersection from the first vehicle and the second vehicle. The computing system 502 can use the encoded topological information to generate the driving scenario model that includes spatial information topological information, and temporal information. It should be appreciated that the above scenario is a simple scenario, and with a more complex scenario, the driving scenario model 512 may be more complex.

The computing system 502 can further use the driving scenario model 512 to determine a contributing factor to the accident. For example, the computing system 502 can include a machine learning model (e.g., a CNN or other appropriate model) that can receive the scenario elements and driving scenario model 512 as inputs and determine each vehicle's contribution to an accident, a severity of the accident, and determine similar accident scenarios. The computing system 502 can further annotate the driving scenario model 512 using metadata to describe the determinations. The computing system 502 can further generate an accident report of the determinations.

The scenario convertor 510 can transmit the to the simulator 514 driving scenario model 512. The simulator 514 can also receive information from a driving assistance system 516 (e.g., PlusDrive) to generate a simulation. A driving simulation can be used to analyze the behavior of an AV during various scenarios. In general, a vehicle computer of an AV can rely on one or more sensors for controlling the operations of the AV. The simulation can be used to simulate sensor inputs (e.g., LiDAR, radar, image-capturing, global navigation satellite system, or other sensor input) to improve the vehicle computer's responsiveness to various scenarios. In some instances, the scenarios can be location-specific. Furthermore, as indicated above, sensor information from a traffic sensor 504 may be superior to sensor information from an on-board sensor to generate a simulation. The location-specific simulation can be used to test various aspects of an AV. For example, simulation can be used for hardware-in-the-loop (HIL) testing for texting an AV's hardware in a simulated environment and software-in-the-loop (SIL) for testing the AV's software in a simulated environment. As the vantage point of the traffic sensor may be different than the vantage point of an on-board sensor, in some instances, a transformation function can be used to cause the simulation inputs to the AV have characteristic of inputs received from an on-board sensor.

The driving scenario model 512 can also be used to generate control instructions for an autonomous vehicle. For example, a vehicle computer can have access to the driving scenario model 512. The vehicle computer can further provide real time sensor information to the model. The vehicle computer can further determine a current location of the autonomous vehicle. For example, the vehicle computer can access a location service (e.g., a global navigation satellite system (GNSS)), to determine a current location. The vehicle computer can further be configured with each of the locations (e.g., a first traffic sensor location 206, a second traffic sensor location 208, a third traffic sensor location 210, and a fourth traffic sensor location 212) from which traffic sensor information has been collected and upon which driving scenario models have been generated. The vehicle computer can then determine whether the AV is within a threshold distance of any of the locations. Based on being within the threshold distance, the vehicle computer can trigger use of the driving scenario model 512. The driving scenario model 512 can process the real time information in real-time. The real time information can be received from the traffic sensor 504 and/or an on-board sensor of the autonomous vehicle. The driving scenario model 512 can process the information to identify one or more elements indicative of a traffic crash about to occur or occurring. Based on the elements, the driving scenario model 512 can generate control instructions to be transmitted to an actuator of the autonomous vehicle. The vehicle computer can cause the control instructions to be transmitted to the actuator for a maneuver that mitigates the traffic accident. The maneuver can cause the AV to avoid the accident or minimize any damage. For example, the maneuver can be to adjust a speed of the AV from stopping to increasing a speed, switch lanes, swerve to avoid an accident, traveling on a new route to a destination as determined by the vehicle computer, or other appropriate maneuver.

The traffic sensor can be stationary, whereas the on-board sensor can be in motion. Even if a stationary sensor and a moving sensor are directed toward the same target, the collected data by each may be different. The traffic sensor can capture information from a fixed point and provide information from the fixed point over a time duration. The moving sensor can capture information from different points over a period of time. In other words, the moving sensor's perspective may be a function of time. Furthermore, the stationary sensor can collect spatial information of an object based on the whether the object moves. For example, the distance between the stationary sensor and an object changes if the object changes its position. On the other hand, the spatial information from a moving sensor can be based on a position of the object and a position of the sensor. The sensor information from the traffic sensor is collected by a stationary sensor. However, an AV vehicle computer that is operating can receive information from moving onboard sensors. Therefore, in order to generate simulation inputs that mimic a real-world scenario, a transformation function can be used to convert a representation of the traffic sensor information from a stationary space representation to a moving space representation.

The simulator 514 can use driving scenario model 512 to generate simulated location specific-sensor data that can be provided to test an AV's software or hardware. The simulator 514 can receive an input indicating desired scenario elements for a simulated traffic accident. The traffic accident may directly involve the AV (e.g., a collision with the AV at a specific location) or indirectly involve the AV (e.g., causing an AV to slow due to accident of another vehicle at a specific-location). For example, the desired elements can include, "side-swipe accident," "potholes on road," "accidents involving trucks," or other desired elements. The simulator 514 can then access a driving scenario model 512 generated using location-specific sensor information to simulate the traffic accident. In this sense, the simulation can be used to determine control instructions for the AV to be executed to mitigate the traffic accident for the specific location. Referring back to FIG. 2, the second traffic sensor location 208 indicate a straight roadway without and cross streets. On the other hand, the third traffic sensor location 210 indicates a four way intersection. Therefore, even though the third traffic sensor location 210 may provide the AV with more options for maneuverability than the second traffic sensor location 208, the AV may also have to consider more oncoming traffic. Therefore, the AV's vehicle computer may control the AV to operate differently to avoid an accident at the second traffic sensor location 208 than the third traffic sensor location 210. For example, if a particular location has a blind spot that causes multiple accidents for cars turning from one street to another street, that element can be reflected in the simulated accidents for that location. If, however, traffic accident information from another location without a blind spot, the simulator 514 may not incorporate the blind spot in the simulated traffic accidents.

The computing system 502 can further change one or more elements to generate as new simulations of traffic accidents. For example, the driving scenario model 512 can be a first driving scenario model generated based on a first set of elements. The computing system 502 can update the first set of elements to generate a second set of elements. For example, the computing system 502 can either add one or more elements to the first set of elements, or the computing system 502 can delete one more elements from the first set of elements. The second set of elements can be transmitted to the scenario convertor 510 that can generate a second driving scenario model 512. For example, the scenario converter 510 can generate the second scenario model by updating one or more of the spatial information, the topological information, the temporal information or other information. By creating new driving scenario models, the computing system can diversify the information that can be used for simulations for an AV. Furthermore, as the second driving scenario model can be based on sensor information from the same traffic sensor 504 that collected the information for the first driving scenario model, the second driving scenario model can also be location-specific.

Figure 6:
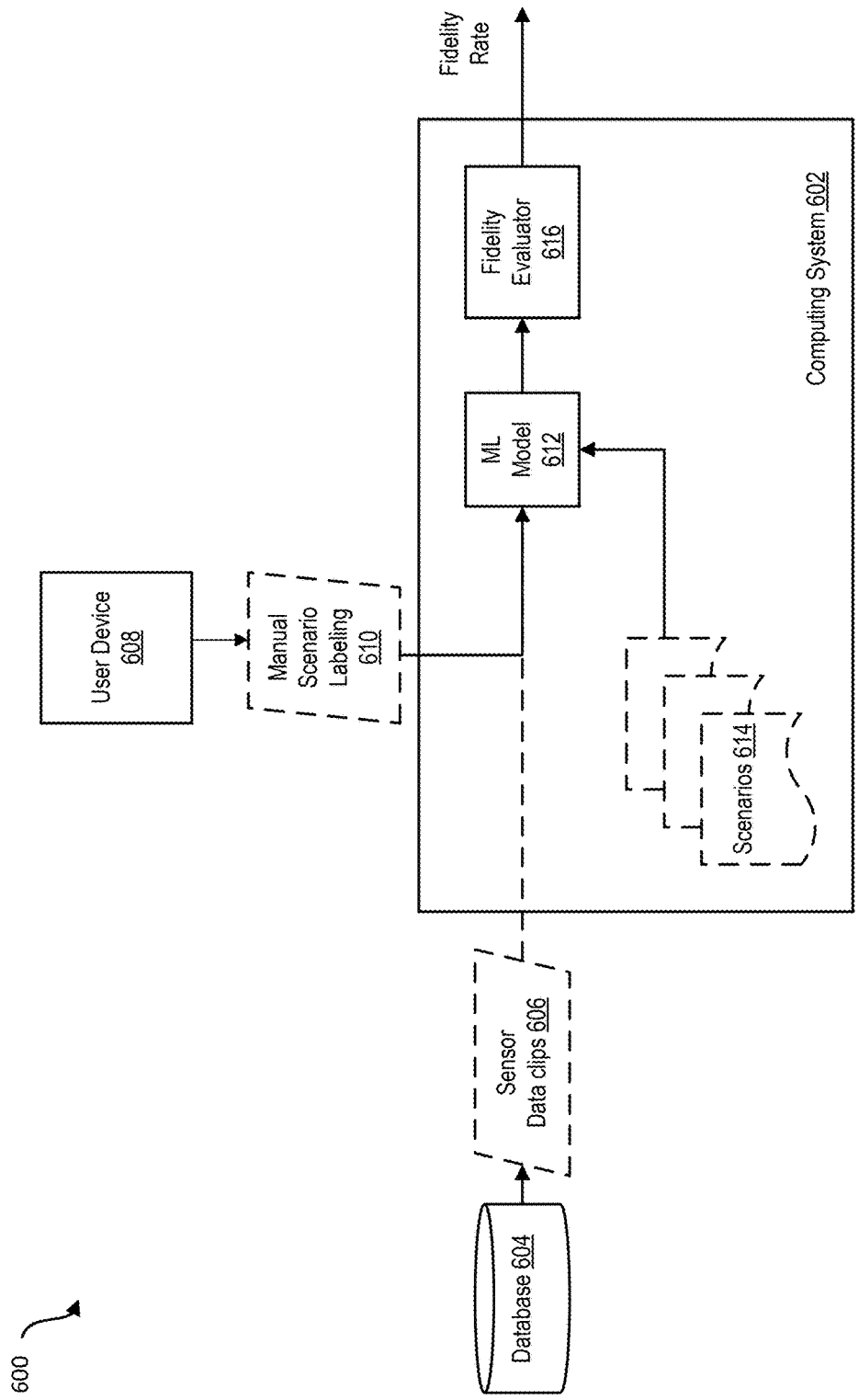
FIG. 6 of an example system for scenario fidelity evaluation, according to one or more embodiments.

FIG. 6 is an illustration 600 of an example system for scenario fidelity evaluation, according to one or more embodiments. A computing system 602 can be configured to determine the fidelity of a simulated scenario to a corresponding real-world scenario. The computing system 602 can access a database 604 (e.g., first database 304) and identify one or more sensor data clips 606. A user device 608 can be used to manually add scenario labeling 610 to the sensor data clips 606 to be used as ground truth data. These labeled sensor data clips 606 can be transmitted to a machine learning model 612 by the computing system 602.

The computing system 602 can further provide one or more scenarios 614 to the machine learning model 612. The machine learning model 612 in conjunction with a fidelity evaluator 616 can determine the fidelity of the scenario to a labeled sensor data clip. This process can assist in evaluating the simulated scenario generation process. For example, a user can use a computing system to generate a scenario by selecting a set of desired elements. Once the user inputs a scenario into the computing system 602, the machine learning model 612 and the fidelity evaluator 616 can compare the scenario 614 with a real scenario data (e.g., labeled sensor data clips) and output a fidelity level. For example, the machine learning model 612 can be trained to identifying elements of various different traffic scenarios (e.g., traffic jams, traffic accidents, traffic patterns). The machine learning model 612 can further be trained to determine whether a scenario describes elements that are likely to be found in a similar real-life scenario. In particular, the machine learning model 612 can be trained to determine whether elements that are likely to be found in a similar real-life event at a particular location (e.g., a first traffic sensor location 206, a second traffic sensor location 208, a third traffic sensor location 210, and a fourth traffic sensor location 212). The machine learning model 612 can transmit an output, including a similarity score (e.g., probability) that the elements in the scenario 614 match a real life event at a particular location, to the fidelity evaluator 616. The fidelity evaluator 616 can compare the simulated score to a threshold similarity. Based on the comparison, the fidelity evaluator 616 can determine whether a scenario is an acceptable representation of a location specific real life event. This can be useful when evaluating if certain scenarios are likely to happen at certain regions or locations on the road network.

Conventional scenario fidelity evaluation methods are based only on vehicle states such as speed, acceleration. The embodiments described herein provide techniques for using a machine learning model 612 to understand the elements of real scenarios, and use the understanding to evaluate if any input scenarios are realistic or not. In some instance, the sensor data clips 606 are not used to generate a driving scenario model unless, the fidelity evaluator determines that they are an acceptable representation of a location-specific real life event.

Figure 7:
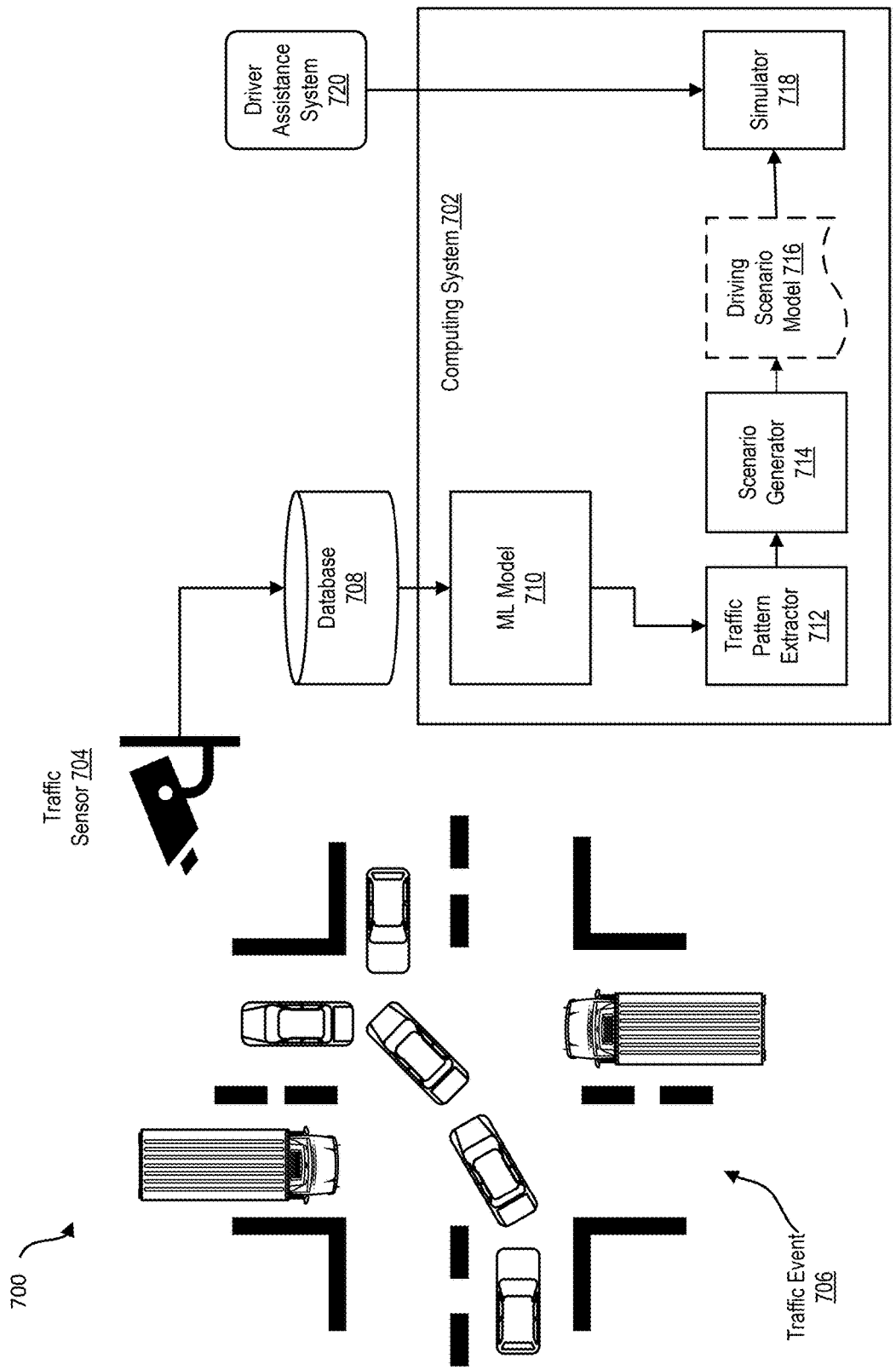
FIG. 7 is an illustration of an example system for scenario data generation, according to one or more embodiments.

FIG. 7 is an illustration 700 of an example system for scenario data generation, according to one or more embodiments. A computing system 702 can be configured to monitor traffic patterns at particular locations and that include one or more elements. A traffic sensor 704 (e.g., traffic sensor 108) can be arranged at a particular location (e.g., a first traffic sensor location 206, a second traffic sensor location 208, a third traffic sensor location 210, and a fourth traffic sensor location 212) and configured to record traffic, including a traffic event 706, where a traffic event can include a traffic occurrence other than a traffic accident. As illustrated, the traffic event 706 can include a traffic jam at an intersection. In other instances, the traffic event can include, for example, a traffic detour, low traffic, a vehicle traveling at an excessive rate, pedestrians blocking traffic, or other traffic event. The traffic event 706 can be associated with one or more scenario elements. For example, a traffic jam pattern may be associated with a slow traffic flow rate, lane change probability, car follow distance, or other traffic element. The sensor information collected by the traffic sensor 704 can be transmitted to a database 708. The computing system 702 can cause the data to be transmitted from the database 708 to a machine learning model 710 (e.g., a convolutional neural network (CNN) or other appropriate model). The machine learning model 710 can be trained to identify various elements from the sensor information. In particular, the machine learning model 710 can be trained using training data collected from the same location at the traffic sensor 704. In this sense, the weights of the machine learning model 710 can be configured for identify elements from the particular location The machine learning model 710 can output a classification of the elements, including time stamps in which each element is identified, associated with the traffic event to the traffic pattern extractor 712.

The traffic pattern extractor 712 can extract the portion of the recorded data that corresponds to the traffic pattern of interest (e.g., the portion that corresponds to the traffic jam). As indicated above, the sensor information can be considered time series information and the elements can be identified with respect to time points. For example, at $T_0$, the machine learning model 710 may have identified the beginning of rain and at $T_1$, the machine learning model 710 may have identified the traffic jam. In this example, the traffic jam can be a traffic pattern of interest, and the rain may be the cause. Therefore, the traffic pattern extractor 712 can segment a portion of the sensor information that corresponds to $T_0$ to $T_1$. The traffic pattern extractor 712 can transmit the segmented portion of the sensor information that corresponds to the rain and the traffic jam to a scenario generator 714. The scenario generator 714 can use the portion of the sensor information to generate a scenario. For example, the scenario generator 714 can include its own machine learning model that is trained to identify additional elements from the segmented portion of sensor information that are associated with the scenario. The computing system 702 can further include a scenario convertor for converting the scenario into a driving scenario model 716. The computing system 702 can use the scenario generator 714 to generate a location-specific driving scenario model that is conditioned on one or more of the identified elements.

The computing system 702 can use the driving scenario model 716 as an input for a simulator 718. The simulator 718 can further receive information from a diving assistance system 720 (e.g., PlusDrive) to generate one or more simulations. As the vantage point of the traffic sensor 704 may be different than the vantage point of an on-board sensor, in some instances, a transformation function can be used to cause the simulation inputs to the AV have characteristic of inputs received from an on-board sensor. In some instances, new simulations maybe desirable. The computing system 702 can generate new set of elements (e.g., second set of elements) and use these elements to generate a new driving scenario model (e.g., second driving scenario model). The simulator 718 can then generate additional simulation based on the new driving scenario model. The simulation can be used for testing and validation of an autonomous vehicle's safety features and functionalities. In some embodiments, the simulation can be used to determining control instructions for a location-specific mitigating driving maneuver for the AV based on the contributing factor and the simulation.

The driving scenario model 716 can also be used to generate control instructions for an autonomous vehicle. For example, a vehicle computer can have access to the driving scenario model 716. The vehicle computer can further provide real time sensor information to the model. The vehicle computer can further determine a current location of the autonomous vehicle. For example, the vehicle computer can access a location service (e.g., a global navigation satellite system (GNSS) or other location service), to determine a current location. The vehicle computer can further be configured with each of the locations (e.g., a first traffic sensor location 206, a second traffic sensor location 208, a third traffic sensor location 210, and a fourth traffic sensor location 212) from which traffic sensor information has been collected and upon which driving scenario models have been generated. The vehicle computer can then determine whether the AV is within a threshold distance of any of the locations. Based on being within the threshold distance, the vehicle computer can trigger use of the driving scenario model 716. In some instances, the trigger can also be a time-based trigger. Certain traffic patterns (traffic congestion, increase in pedestrian traffic, or other pattern) at certain times of day to repeat. For example, traffic may become more congested between 7:00 am and 9:00 am due to people commuting to work. Therefore, the vehicle computer can determine a current time point (e.g., 6:45 am, 7:30 am, 3:00 pm, or other time point) The vehicle computer can further be configured with time points associated with different traffic events. For example, for morning rush hour congestion, the vehicle computer can be configured with time points between 7:00 am and 9:00 am (e.g., time points at one see intervals, one minute intervals, or other intervals). The vehicle computer can further determine whether the current time is which a threshold time interval (e.g., five minutes, ten minutes, or other time interval) of a configured time point. If the current time is within the threshold of a configured time point, the vehicle computer can trigger the driving scenario model 716. In some embodiments, the traffic event is a recurring traffic event (e.g., morning rush hour traffic, evening rush hour traffic, or other recurring traffic event). Furthermore, the control instructions can be location specific-control instructions. In these embodiments, the vehicle computer can store the control instructions in memory to be reused later. For example, upon determining AV is within a threshold distance of a location with a recurring traffic event and that the current time is within a threshold time interval of a configured time, the vehicle computer can access the control instructions.

The driving scenario model 716 can process the real time information in real-time. The real time information can be received from the traffic sensor 704 and/or an on-board sensor of the autonomous vehicle. The driving scenario model 716 can process the information to identify one or more elements indicative of a traffic crash about to occur or occurring. Based on the elements, the driving scenario model 716 can generate control instructions to be transmitted to an actuator of the autonomous vehicle. The vehicle computer can cause the control instructions to be transmitted to the actuator for a maneuver that mitigates the traffic accident. The maneuver can cause the AV to avoid the accident or minimize any damage. For example, the maneuver can be to adjust a speed of the AV from stopping to increasing a speed, switch lanes, swerve to avoid an accident in the future, traveling on a new route to a destination as determined by the vehicle computer, or other appropriate maneuver.

Figure 8:
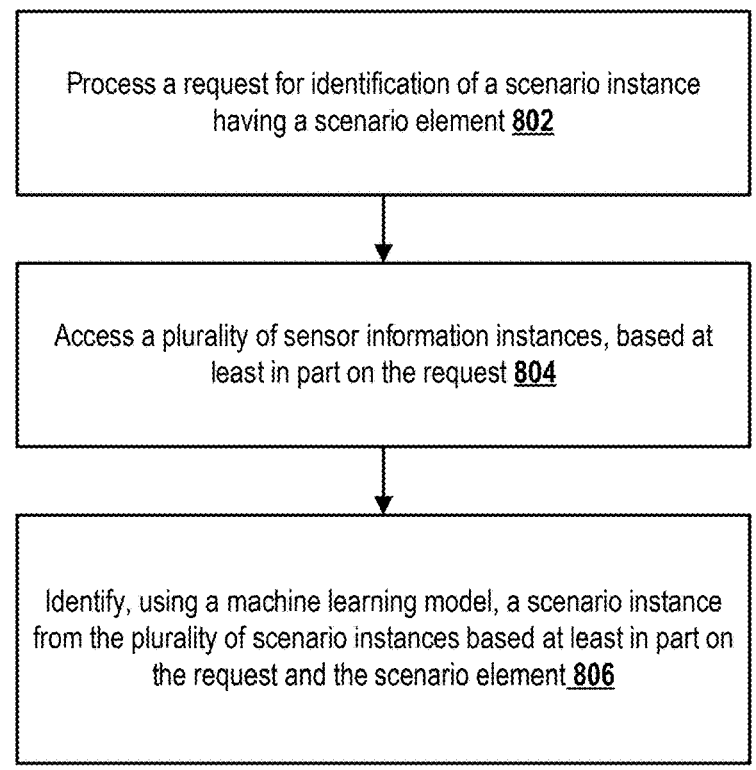
FIG. 8 is an example process for scenario identification, according to one or more embodiments.

FIG. 8 is an example process 800 for scenario identification, according to one or more embodiments. While the operations of processes 800, 900, 1000, 1100, 1200, 1300, and 1400 are described as being performed by generic computers, it should be understood that any suitable device may be used to perform one or more operations of these processes. Processes 800, 900, 1000, 1100, 1200, 1300, and 1400 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes. At 802, the process 800 can include a computing system processing a request for identification of a scenario having a scenario element (e.g., a road element, a vehicle element, environment element, or other element). At 804, the process 800 can include the computing system accessing sensor information, based at least in part on the request. The sensor information can be collected from a traffic sensor and accessed from a database. At 806, the process 800 can include the computing system identifying, using a machine learning model, a scenario (e.g., a set of elements) from the plurality of scenarios stored in a database based at least in part on the request and the scenario element.

Figure 9:
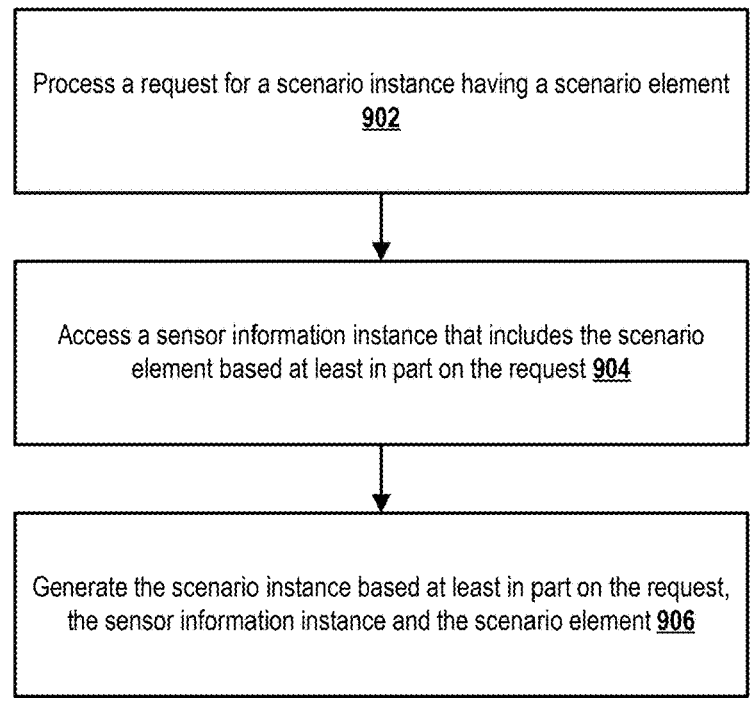
FIG. 9 is an example process generating a scenario, according to one or more embodiments.

FIG. 9 is a process 900 for scenario generation, according to one or more embodiments. At 902, the process 900 can include a computing system processing a request for a scenario having a scenario element (e.g., a road element, a vehicle element). At 904, the process 900 can include the computing system accessing a sensor-based information that includes the scenario element based at least in part on the request. The sensor information can be collected from a traffic sensor (e.g., traffic sensor 108) and accessed from a database. At 906, the process 900 can include the computing system generating the scenario based at least in part on the request, the sensor information and the scenario element.

Figure 10:
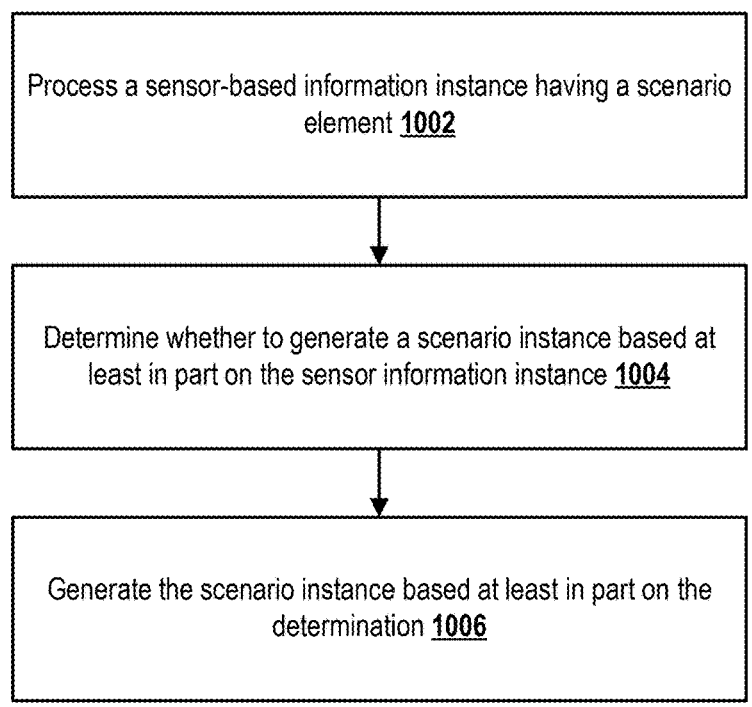
FIG. 10 is an example process for determining whether to generate a scenario, according to one or more embodiments.

FIG. 10 is an example process 1000 for determining whether to generate a scenario, according to one or more embodiments. At 1002, the process 1000 can include a computing system receiving a sensor-based information having an element. At 1004, the process 1000 can include the computing system determining whether to generate a scenario based at least in part on the sensor information. For example, the computing system can determine the priority of the element. For example, the computing system can determine whether a request for a scenario describing the element has been received. If a request has been received, the computing system can determine that a priority has been established to generate the scenario. If a request has not been received, the computing system can determine that a priority has not been established to generate the scenario. At 1006, the process 1000 can include the computing system generating the scenario based at least in part on the determination.

Figure 11:
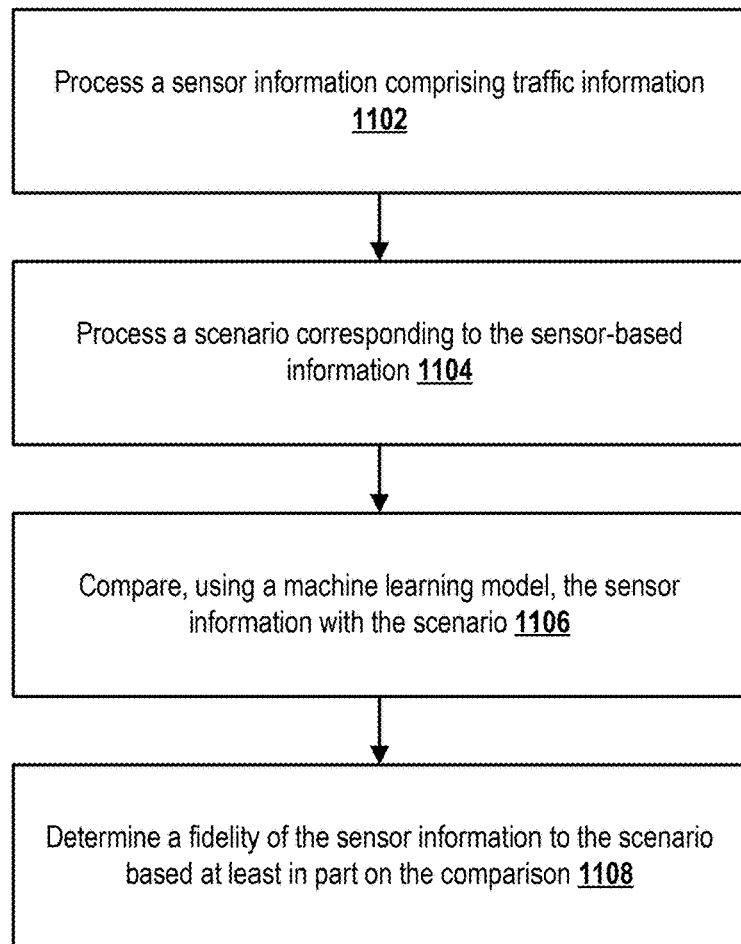
FIG. 11 is a process flow for determining a fidelity of a scenario to a real life event, according to one or more embodiments.

FIG. 11 is a process 1100 for determining a fidelity of a scenario to a real life event, according to one or more embodiments. At 902, the process 1100 can include a computing system receiving sensor information (e.g., a sensor data clip) the sensor information comprising traffic information. At 1104, the method can include the computing system receiving a scenario corresponding to the sensor-based information. At 1106, the process 1100 can include the computing system comparing, using a machine learning model, the sensor-based information with the scenario. For example, the computing system can include a fidelity evaluator that is configured to work in conjunction with a machine learning model to evaluate the fidelity of the scenario to a real life event. At 1108, the process 1100 can include the computing system determining a fidelity of the sensor information to the scenario based at least in part on the comparison.

Figure 12:
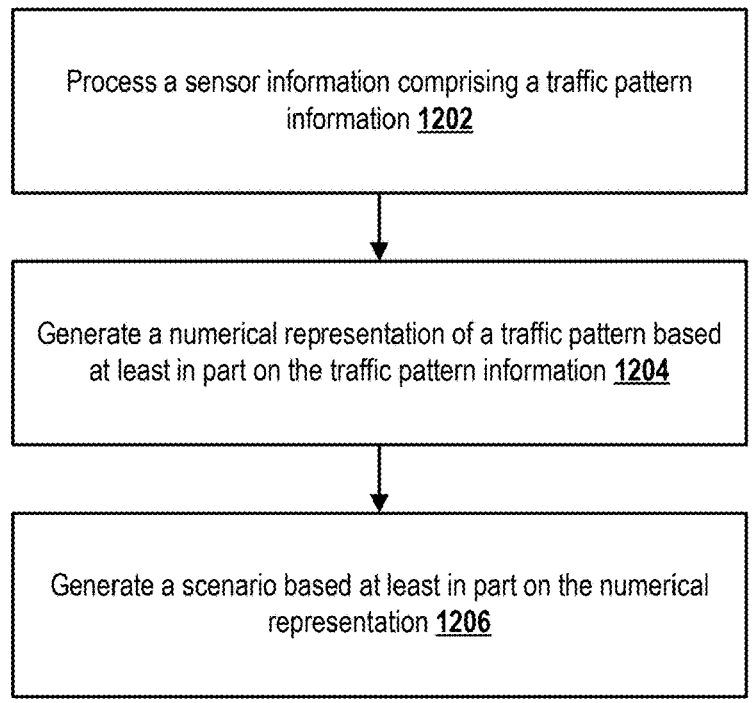
FIG. 12 is an example process for generating a scenario, according to one or more embodiments.

FIG. 12 is an example process 1200 for generating a scenario, according to one or more embodiments. At 1202, the process 1200 can include a computing system receiving a sensor-based information comprising a traffic pattern information. The sensor information can be collected from a traffic sensor and accessed from a database. At 1204, the process 1200 can include the computing system generating a numerical representation of a traffic pattern based at least in part on the traffic pattern information. The numerical representation can describe one or more elements. At 1206, the process 1200 can include the computing system generating a scenario based at least in part on the numerical representation. The scenario can include a model that is based on the numerical representation.

Figure 13:
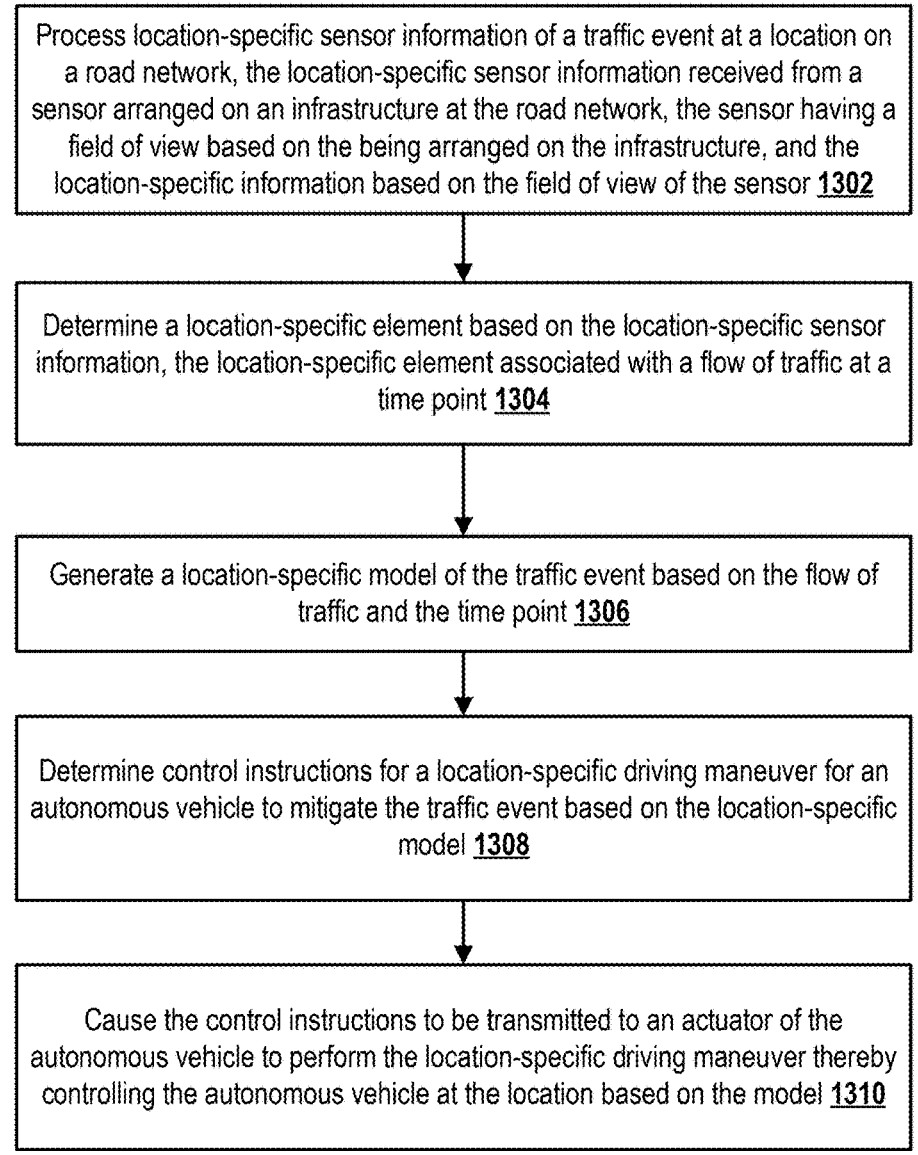
FIG. 13 is an example process for generating a simulation of a traffic event, according to one or more embodiments.

FIG. 13 is an example process 1300 for generating a simulation of a traffic event, according to one or more embodiments. At 1302, the process 1300 can include a computing system processing location-specific sensor information of a traffic event at a location on a road network (e.g., road network 102). The location-specific sensor information received from a sensor (e.g., traffic sensor 108) arranged on an infrastructure (e.g., traffic infrastructure 112) at the road network. The sensor can have a field of view based on the being arranged on the infrastructure. The location-specific sensor information can be based on the field of view of the sensor;

At 1304, the process can include the computing system determining a location-specific element (e.g., road element, vehicle element, environmental element, or other element) based on the location-specific sensor information. The location-specific element can be associated with a flow of traffic (e.g., congestion, smooth traffic flow, sparse traffic flow, or other traffic flow) at a time point.

At 1306, the process 1300 can include the computing system generating a location-specific model (e.g., driving scenario model 716) of the traffic event based on the flow of traffic and the time point.

At 1308, the process 1300 can include the computing system determining control instructions for a location-specific driving maneuver for an autonomous vehicle to mitigate the traffic event based on the location-specific model.

At 1310, the process 1300 can include the computing system causing the control instructions to be transmitted to an actuator of the autonomous vehicle to perform the location-specific driving maneuver thereby controlling the autonomous vehicle at the location based on the model.

Figure 14:
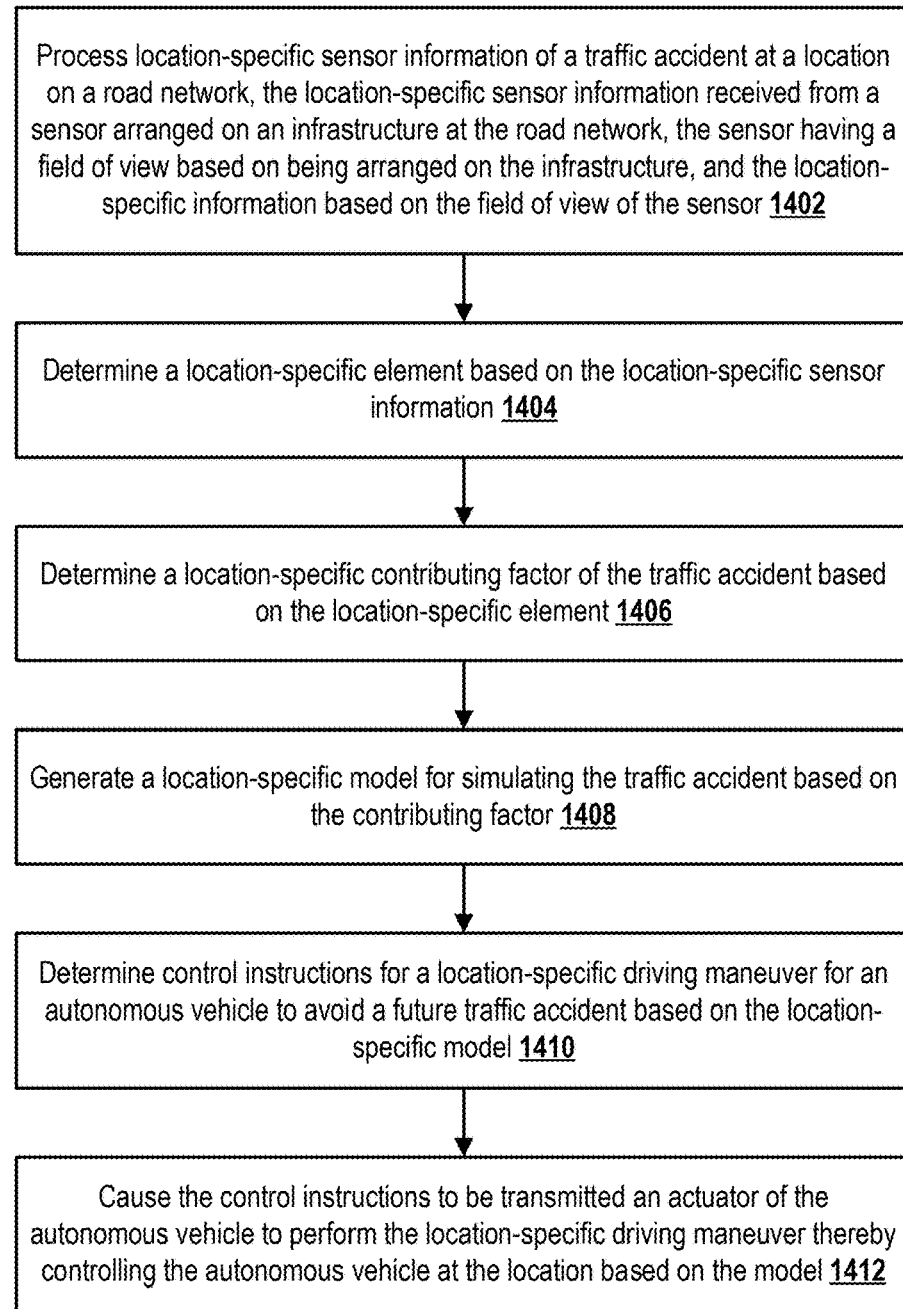
FIG. 14 is an example process for generating a simulation of a traffic accident, according to one or more embodiments.

FIG. 14 is an example process 1400 for generating a simulation of a traffic accident, according to one or more embodiments. At 1402, the process 1400 can include a computing system processing location-specific sensor information of a traffic accident at a location on a road network (e.g., road network 102). The location-specific sensor information can be received from a sensor (e.g., traffic sensor 108) arranged on an infrastructure (traffic infrastructure 112) at the road network. The sensor can have a field of view based on being arranged on the infrastructure. The location-specific sensor information based on the field of view of the location-specific sensor.

At 1404, the process 1400 can include the computing system determining a location-specific element (e.g., road element, vehicle element, environmental element, or other element) based on the location-specific sensor information.

At 1406, the process can include the computing system determining a location-specific contributing factor of the traffic accident based on the location-specific element.

At 1408, the process 1400 can include generating a location-specific model for simulating the traffic accident based on the location-specific contributing factor.

At 1410, the process 1400 can include the computing system determining control instructions for a location-specific driving maneuver for an autonomous vehicle to mitigate a future traffic accident based on the location-specific model.

At 1412, the process 1400 can include the computing system causing the control instructions to be transmitted to an actuator of the autonomous vehicle to perform the location-specific driving maneuver thereby controlling the autonomous vehicle at the location based on the location-specific model.

Figure 15:
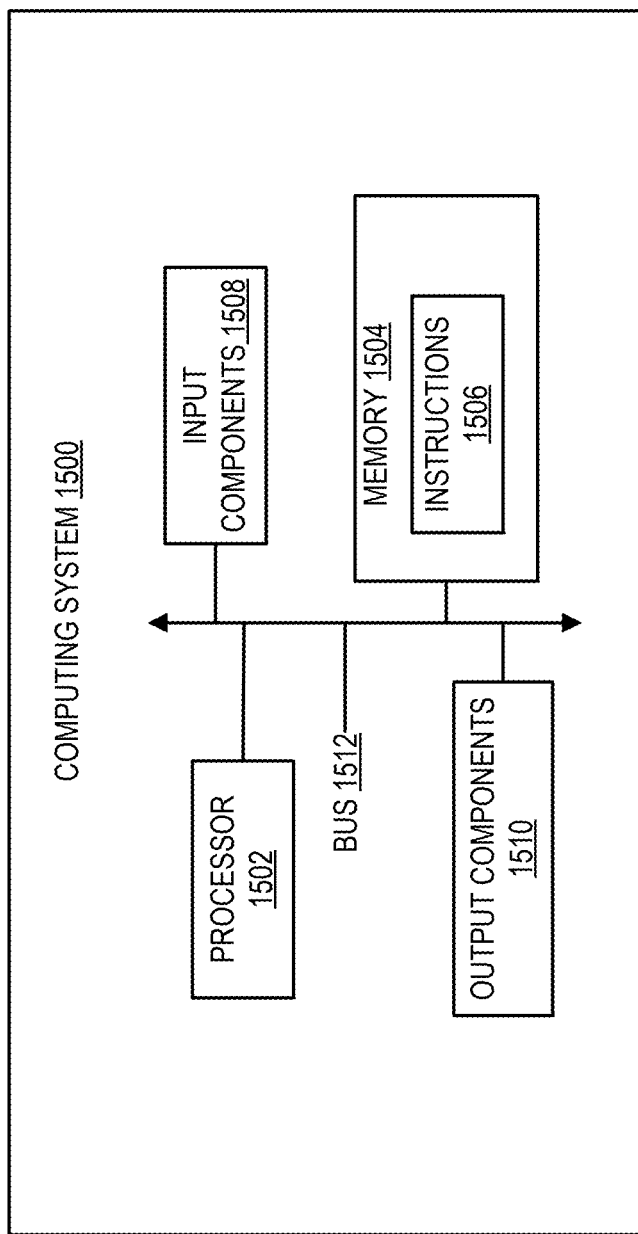
FIG. 15 is a block diagram of an example of a computing device usable for implementing some aspects of the present disclosure.

FIG. 15 is a block diagram of an example of a computing device 1500 usable for implementing some aspects of the present disclosure. The computing device 1500 includes a processor 1502 coupled to a memory 1504 via a bus 1512. The processor 1502 can include one processing device or multiple processing devices. Examples of the processor 1502 include a Field-Programmable Gate Array (FPGA), an application-specific integrated circuit (ASIC), a microprocessor, or any combination of these. The processor 1502 can execute instructions 1506 stored in the memory 1504 to perform operations. In some examples, the instructions 1506 can include processor-specific instructions generated by a compiler or an interpreter from code written in any suitable computer-programming language, such as C, C++, C#, Python, or Java.

The memory 1504 can include one memory device or multiple memory devices. The memory 1504 may be non-volatile and include any type of memory device that retains stored information when powered off. Examples of the memory 1504 can include electrically erasable and programmable read-only memory (EEPROM), flash memory, or any other type of non-volatile memory. At least some of the memory 1504 includes a non-transitory computer-readable medium from which the processor 1502 can read instructions 1506. The instructions can cause one or more processors to, for example, process sensor information, generate a driving scenario model, and generate a simulation input.

A computer-readable medium can include electronic, optical, magnetic, or other storage devices capable of providing the processor 1502 with computer-readable instructions or other program code. Examples of a computer-readable medium include magnetic disks, memory chips, ROM, random-access memory (RAM), an ASIC, a configured processor, optical storage, or any other medium from which a computer processor can read the instructions 1506.

The computing device 1500 may also include other input and output (I/O) components. The input components 1508 can include a mouse, a keyboard, a trackball, a touch pad, a touch-screen display, or any combination of these. The output components 1510 can include a visual display, an audio display, a haptic display, or any combination of these. Examples of a visual display can include a liquid crystal display (LCD), a light-emitting diode (LED) display, and a touch-screen display. An example of an audio display can include speakers. Examples of a haptic display may include a piezoelectric device or an eccentric rotating mass (ERM) device.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein, can be combined with any other examples.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques, including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate, and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
    processing, by a computing system, location-specific sensor information of a traffic accident at a location on a road network, the location-specific sensor information received from a sensor arranged on an infrastructure at the road network, the sensor having a field of view based on being arranged on the infrastructure, and the location-specific sensor information based on the field of view of the sensor;
    determining, by the computing system, a location-specific element based on the location-specific sensor information;
    determining, by the computing system, a location-specific contributing factor of the traffic accident based on the location-specific element;
    generating, by the computing system, a location-specific model for simulating the traffic accident based on the location-specific contributing factor;
    accessing, by the computing system, the location-specific sensor information based at least in part on generating the location-specific model;
    determining, by the computing system, a fidelity of the location-specific model to the location-specific sensor information;
    determining, by the computing system, an acceptability of the location-specific model based at least in part on the fidelity;
    incorporating, by the computing system, a representation of a first hypothetical autonomous vehicle into the location-specific model;
    determining, by the computing system, control instructions for a location-specific driving maneuver for a second autonomous vehicle to mitigate a future traffic accident based on the location-specific model, the control instructions determined based on incorporating the representation of the first hypothetical autonomous vehicle into the location-specific model; and
    causing, by the computing system, the control instructions to be transmitted to an actuator of the second autonomous vehicle to perform the location-specific driving maneuver thereby controlling the second autonomous vehicle at the location based on the location-specific model.

2. The method of claim 1, wherein the location-specific element is a first location-specific element, and wherein the method further comprises:
    receiving real time location-specific sensor information from the sensor; and
    determining a second location-specific element indicating a traffic accident based on the real time location-specific sensor information, wherein the control instructions are transmitted based on the determining the second location-specific element indicating the traffic accident.

3. The method of claim 1, wherein the method further comprises;
    generating synthetic information associated with the autonomous vehicle, wherein the synthetic information incorporates a representation of the autonomous vehicle into the location-specific model, and wherein the control instructions are determined based on incorporating the representation of the autonomous vehicle into the location-specific model.

4. The method of claim 1, wherein the location-specific sensor information is associated with a stationary space based on the sensor being a stationary sensor, and wherein the method further comprises:
    determining a transformation function for converting the location-specific sensor information from a stationary space representation to a moving space representation, and wherein the location-specific model is determined based on the moving space representation.

5. The method of claim 1, wherein the location is a first location along a route, wherein the location-specific sensor information is first location specific sensor information, wherein the infrastructure is a first infrastructure, and wherein the method further comprises:
    identifying second location-specific sensor information from a second sensor arranged on a second infrastructure at a second location along the route, wherein the location-specific model is determined based on the first location specific sensor information and second location-specific sensor information.

6. The method of claim 5, wherein the method further comprises:
determining a route of the autonomous vehicle based on the road network;
determining that the second location is on the route;
determining that a third sensor is located at a third location outside of the route; and
determining to use a second location-specific element associated with the second location to determine the location-specific model instead of a third location-specific element associated with the third location based on the second location being on the route and the third location being located outside of the route.

7. The method of claim 1, wherein the location-specific element is determined based on information from a driver assistance system.

8. The method of claim 1, wherein the location-specific element is a road element describing a characteristic of a road upon which the traffic accident occurred.

9. The method of claim 8, wherein the method further comprises;
determining a vehicle element based on the location-specific sensor information, the vehicle element describing a characteristic of a vehicle involved in the traffic accident, wherein the location-specific model is determined based on the vehicle element.

10. The method of claim 1, wherein mitigating the future traffic accident comprises avoiding the future traffic accident.

11. The method of claim 1, wherein the method further comprises:
receiving an identification of an element not described in the location-specific sensor information; and
generating a location-specific synthetic element representing the element, and wherein the location-specific model is determined based on the location-specific synthetic element.

12. A computing system, comprising:
one or more processors; and
one or more non-transitory, computer-readable media including instructions that, when executed, cause one or more processors to:
process location-specific sensor information of a traffic accident at a location on a road network, the location-specific sensor information received from a sensor arranged on an infrastructure at the road network, the sensor having a field of view based on being arranged on the infrastructure, and the location-specific sensor information based on the field of view of the sensor;
determine a location-specific element based on the location-specific sensor information;
determine a location-specific contributing factor of the traffic accident based on the location-specific element;
generate a location-specific model for simulating the traffic accident based on the location-specific contributing factor;
access the location-specific sensor information based at least in part on generating the location-specific model;
determine a fidelity of the location-specific model to the location-specific sensor information;
determine an acceptability of the location-specific model based at least in part on the fidelity;
incorporate a representation of a first hypothetical autonomous vehicle into the location-specific model;
determine control instructions for a location-specific driving maneuver for a second autonomous vehicle to mitigate a future traffic accident based on the location-specific model, the control instructions determined based on incorporating the representation of the first hypothetical autonomous vehicle into the location-specific model; and
cause the control instructions to be transmitted to an actuator of the second autonomous vehicle to perform the location-specific driving maneuver thereby controlling the second autonomous vehicle at the location based on the location-specific model.

13. The computing system of claim 12, wherein the location-specific element is a first location-specific element, and wherein the instructions that, when executed, further cause the one or more processors to:
receive real time location-specific sensor information from the sensor; and
determine a second location-specific element indicating a traffic accident based on the real time location-specific sensor information, wherein the control instructions are transmitted based on determining the second location-specific element indicating the traffic accident.

14. The computing system of claim 12, wherein the instructions that, when executed, further cause the one or more processors to:
generating synthetic information associated with the autonomous vehicle, wherein the synthetic information incorporates the autonomous vehicle into the location-specific model, and wherein the control instructions are determined based on incorporates the autonomous vehicle into the location-specific model.

15. The computing system of claim 12, wherein the location-specific sensor information is associated with a stationary space based on the sensor being a stationary sensor, and wherein the instructions that, when executed, further cause the one or more processors to:
determining a transformation function for converting the location-specific sensor information from a stationary space representation to a moving space representation, and wherein the location-specific model is determined based on the moving space representation.

16. The computing system of claim 12, wherein the location is a first location, wherein the location-specific sensor information is first location specific sensor information, wherein the infrastructure is a first infrastructure, and wherein the instructions that, when executed, further cause the one or more processors to:
identify a second location-specific element from a second sensor arranged on a second infrastructure at a second location on the road network, wherein the location-specific model is determined based on the second location-specific element.

17. The computing system of claim 16, wherein the instructions that, when executed, further cause the one or more processors to:
determine a route of the autonomous vehicle based on the road network;
determine that the second location is on the route; and
determine to use the second location-specific element to determine the location-specific model instead of third location-specific element associated with a third sensor that is outside of the route based on the second location being on the route.

18. The computing system of claim 12, wherein the location-specific element is determined based on information from a driver assistance system.

19. One or more non-transitory computer-readable media having stored thereon a sequence of instructions which, when executed, cause one or more processors to:
process location-specific sensor information of a traffic accident at a location on a road network, the location-specific sensor information received from a sensor arranged on an infrastructure at the road network, the sensor having a field of view based on being arranged on the infrastructure, and the location-specific information based on the field of view of the sensor;
determine a location-specific element based on the location-specific sensor information;
determine a location-specific contributing factor of the traffic accident based on the location-specific element;
generate a location-specific model for simulating the traffic accident based on the location-specific contributing factor;
access the location-specific sensor information based at least in part on generating the location-specific model;
determine a fidelity of the location-specific model to the location-specific sensor information;
determine an acceptability of the location-specific model based at least in part on the fidelity;
incorporate a representation of a first hypothetical autonomous vehicle into the location-specific model;
determine control instructions for a location-specific driving maneuver for a second autonomous vehicle to avoid a future traffic accident based on the location-specific model, the control instructions determined based on incorporating the representation of the first hypothetical autonomous vehicle into the location-specific model; and
cause the control instructions to be transmitted an actuator of the second autonomous vehicle to perform the location-specific driving maneuver thereby controlling the second autonomous vehicle at the location based on the location-specific model.

20. The one or more non-transitory, computer-readable media of claim 19, wherein the location-specific element is a first location-specific element, and wherein the instructions that, when executed, further cause the one or more processors to:
receive real time location-specific sensor information from the sensor; and
determine a second location-specific element indicating a traffic accident based on the real time location-specific sensor information, wherein the control instructions are transmitted based on determining the second location-specific element indicating the traffic accident.

* * * * *